United States Patent [19]

Ajmera

[11] Patent Number: 4,764,403
[45] Date of Patent: Aug. 16, 1988

[54] MULTILAYER BIAXIALLY ORIENTED HEAT SET ARTICLES

[75] Inventor: Prakash R. Ajmera, Toledo, Ohio

[73] Assignee: Owens-Illinois Plastic Products Inc., Toledo, Ohio

[21] Appl. No.: 929,047

[22] Filed: Nov. 10, 1986

[51] Int. Cl.$^4$ .................... B65D 1/00; B65D 23/00; B32B 27/08

[52] U.S. Cl. .................... 428/35; 428/215; 428/483; 428/515; 428/910; 428/355; 264/530; 215/1 C

[58] Field of Search .............. 428/35, 215, 515, 483, 428/910, 355

[56] References Cited

U.S. PATENT DOCUMENTS 4,535,901  8/1985  Okudaira et al. ............ 428/35 X
4,564,541  1/1986  Taira et al. ................ 428/483 X Primary Examiner—P. C. Ives

[57] ABSTRACT

A multilayer biaxially oriented heatset article and method of making forming a preform comprising an outer layer and an inner layer of poly(ethylene terephthalate) (PET), an intermediate layer of olefin-vinyl alcohol copolymer, a layer of adhesive laminating the olefin-vinyl alcohol copolymer layer and the outer layer and a layer of adhesive laminating the inner olefin-vinyl alcohol copolymer layer and the inner layer. The preform is then heated to orientation temperature and blown against a heatset hot mold to produce an article such as a container that has high barrier properties, improved thermal stability, i.e., capable of being hot filled at elevated temperatures, have layer uniformity, good interlayer adhesion., good transparency and is light in weight.

9 Claims, 4 Drawing Sheets

MULTILAYER BIAXIALLY ORIENTED HEAT SET ARTICLES

This invention relates to biaxially oriented plastic containers having improved barrier properties.

BACKGROUND AND SUMMARY OF THE INVENTION

U.S. Pat. No. 4,564,541 discloses a hollow plastic container having a laminated structure comprising a layer of poly(ethylene terephthalate) and a gas barrier layer of an olefin-vinyl alcohol copolymer wherein the layers are laminated by an adhesive layer composed of copolyester. Such containers will have a poor appearance because of lines or striations existing in the container due to the variation in thickness of the barrier layer or adhesive layer, or both, resulting from the forming process and the blowing process. In addition, in such containers, the peel strength decreases during elongation or blowing. The containers also do not have good thermal stability so that the containers can be filled with hot contents.

In copending application, Ser. No. 841,651, filed Mar. 20, 1986, now U.S. Pat. No. 4,713,269, having a common assignee with the present application, there is disclosed a heatset container made from a parison comprising at least one layer of poly(ethylene terephthalate) and a barrier layer of a copolyester without the use of an adhesive. The resultant container has properties comparable to heatset poly(ethylene terephthalate). The interlayer adhesion between the poly(ethylene terephthalate) and the copolyester were found to be essentially the same as a non-heatset multilayer container of the same layers.

Among the objectives of the present invention are to provide multilayer containers which have high barrier properties; improved thermal stability, that is capable of being hot filled at elevated temperatures; have good interlayer adhesion; have layer uniformity; have good transparency; and be light in weight.

In accordance with the invention, a multilayer biaxially oriented heatset article and method of making forming a preform comprising an outer layer, an inner layer of poly(ethylene terephthalate), an intermediate layer of olefin-vinyl alcohol copolymer, a layer of adhesive laminating the olefin-vinyl alcohol copolymer layer and the outer layer and a layer of adhesive laminating the olefin-vinyl alcohol copolymer layer and the inner layer. The preform is then heated to orientation temperature and blown against a heatset hot mold to produce an article such as a container that has high barrier properties, improved thermal stability, i.e., capable of being hot filled at elevated temperatures, have layer uniformity, good interlayer adhesion, good transparency and is light in weight.

DESCRIPTION

Figure 1:
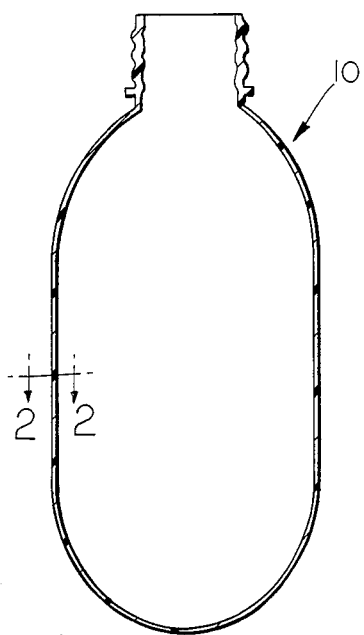
FIG. 1 is an elevational view of a hollow biaxially oriented heatset container embodying the invention.
Figure 2:
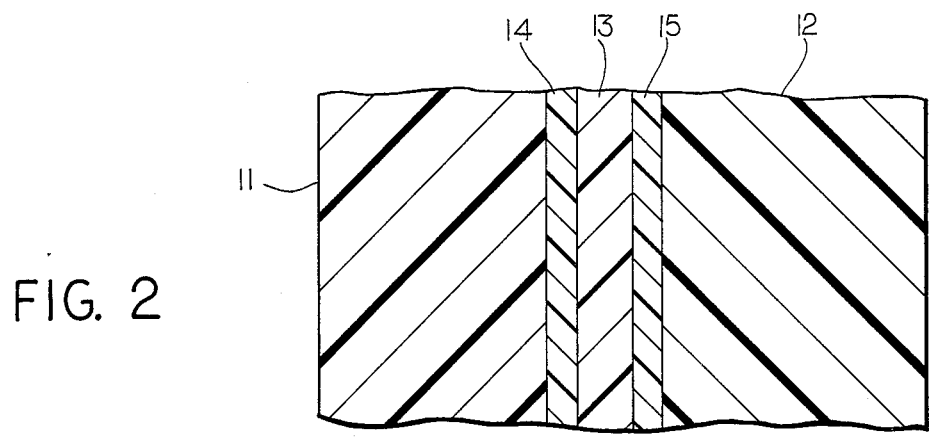
FIG. 2 is a fragmentary sectional view of a portion of the container taken along the line 2—2 in FIG. 1.

Basically, the invention comprises making a multilayer biaxially oriented heatset hollow container 10 by conventional blow molding and heatsetting methods from a multilayer preform made from a parison comprising an outer layer 11, an inner layer 12 of poly(ethylene terephthalate), an intermediate layer 13 of olefin-vinyl alcohol copolymer, a layer 14 of adhesive laminating the olefin-vinyl alcohol copolymer layer 13 and the outer layer 11 and a layer 15 of adhesive laminating the olefin-vinyl alcohol copolymer layer 13 and the inner layer 12.

When the preform is heated to orientation temperature and blown against a heatset hot mold, an article in the form of a container is produced that is light in weight, unbreakable, has high barrier properties, improved thermal stability i.e. is capable of being hot filled at elevated temperatures of 90° C. or higher, good interlayer adhesion, and no striations.

More specifically, a PET parison which has been heated to an orientation temperature between 90°–110° C. is blown against the confines of a hot mold which is at temperature ranging between 150° C.–250° C. to increase the crystallinity of the blown container and the container is then quenched, as shown, for example, in U.S. Pat. Nos. 4,385,089, 4,512,948, 4,522,779, and my pending application Ser. No. 923,503 filed Oct. 27, 1986, titled "METHOD OF MAKING PARTIALLY CRYSTALLINE BIAXIALLY ORIENTED HEAT SET CONTAINERS", having a common assignee with the present application, which are incorporated herein by reference.

The toal thickness of the outer and inner layers of poly(ethylene terephthalate) comprises more than 50% of the thicknesss of the multilayer structure throughout the container and are preferable 70% of the thickness of the multilayer structure throughout the container.

An example of a method which can be used comprises:
1. Poly(ethylene terephthalate), olefin-vinyl alcohol copolymer and adhesive are coextruded into a pipe.
2. A pipe is cut into appropriate length and a preform is formed.
3. The preform or parison is heated to the orientation temperature.
4. The preform is blown by blowing fluid which is first applied at a lower pressure and then at a higher pressure to maintain contact of the container with a hot mold to heatset the container.
5. A container is maintained in contact with the hot mold.
6. The container is exhausted to a lower transfer pressure.
7. The mold is opened and the container is transferred to the cold mold.
8. The container is reblown at a pressure higher than the transfer pressure in a cold mold.
9. The container is maintained in contact with the cold mold.
10. The container is exhausted to atmospheric pressure.
11. The cold mold is opened and the container is released.

The resultant hollow article in the form of a container has the following properties:
1. Provides clear ultrahigh barrier containers with improved thermal stability.

2. Interlayer adhesion was improved by about factor of three over a non-heatset multilayer container with the same multilayer construction.
3. Striations of the container are completely eliminated due to improved uniformity of the thickness of the olefin-vinyl alcohol copolymer layer.
4. The multilayer structure showed lower density of poly(ethylene terephthalate) layer and improved thermal stability, i.e., exhibits a lesser shrinkage at a given hot fill temperature than a container comprising a single layer of heatset PET.

The present invention is especially concerned with polymers of poly(ethylene terephthalate) having an inherent viscosity of at least 0.6. Poly(ethylene terephthalate) polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-dinol; diethylene glycol; propane-1,3-diol; poly tetramethylene glycol); poly(ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene terephthalate).

The olefin-vinyl alcohol barrier copolymer layer preferably comprises ethylene-vinyl alcohol copolymer.

The adhesive layer for the present invention should have some adhesion with each of the PET and olefin-vinyl alcohol copolymer layers. The adhesive may have preferentially greater adhesion with the PET or the olefin-vinyl alcohol copolymer.

An adhesive for PET has polar groups on the main chain or side chain. The adhesive strength is obtained by either forming a covalent or hydrogen or van der Waals or ionic bonds between the polar groups of the adhesive and PET. An example of a preferred adhesive for PET is copolyester. Copolyester is formed by the reaction of at least one diabasic acid with at least one glycol. Copolyester has a carboxyl group in the repeating unit. Other examples of polar groups on the polymer chain include amide group and anhydride.

A suitable adhesive may comprise a copolyester adhesive comprising in the main chain at least two acid components selected from (i) an isaphthalic acid component, (ii) a terepthalic acid component, and (iii) a linear or cyclic aliphatic diabasic acid component as described in U.S. Pat. No. 4,564,541 which is incorporated herein by reference.

An adhesive for olefin-vinyl alcohol copolymer has polar groups on the main chain or side chain of the polymer. The adhesive strength is obtained by either forming a covalent or hydrogen or van der Waals or ionic bond between polar groups of the adhesive and olefin vinyl alcohol copolymers. Examples of a preferred adhesive for olefin viny alcohol copolymers are maleic anhydride modified polyolefin, nylon, and a blend of Nylon 6 and Nylon 6,6.

PET, adhesive and olefin vinyl alcohol copolymer are either coextruded or coinjection molded. In the above processes, all materials are in the molten state for a very short period of time and then the structure is quenched. When the materials are in the molten stage, the interlayer adhesion is obtained by the formation of either covalent or hydrogen or ionic or van der Waals bands between different layers.

In accordance with the present invention, after the heatsetting stage, the interlayer adhesion is significantly increased to both layers. The adhesion between the layer having the lesser initial adhesion to the adhesive is increased and the adhesion between the layer having the greater initial adhesion to the adhesive is also increased. As a result, the peel strength of the laminated structure is increased.

During the heatsetting, the olefin-vinyl alcohol copolymer softens at lower heatsetting temperatures and melts at higher heatsetting temperatures. The latter is desirable to obtain higher thermal stability in order to permit hot-filling of the laminated article. The adhesive also softens at lower heatsetting temperature and melts at higher heatsetting temperatures.

Typical tests have been conducted showing material distribution, crystallinity, interlayer adhesion, thermal stability, optical clarity, and barrier properties.

In these tests, the layers of poly(ethylene terephthalate) has an I.V of 0.8. Inherent viscosity as referred to herein is the viscosity as measured in a 60/40 weight phenol/tetrachloroethane solution at 25° C.

The barrier layer comprises a random copolymer of ethylene and vinyl alcohol which comprises 32% ethylene having a melt index of 1.3. The adhesive comprised of copolyester adhesive having a density of 1.1 gm/cc, and a melting point of about 128° C., an experimental resin manufactured by Eastman Chemical, Kingsport, Tenn. The olefin-vinyl alcohol copolymer utilized in the tests is manufactured by Kuraray Co., Ltd., and is sold in the United States by Eval Company of America, 222 So. 15th St., South Tower, P.O. Box 3565, Omaha, Nebr. 68103, under the registered trademark "EVAL". It is described as a random crystalline copolymer of ethylene and vinyl alcohol having a molecular structure represented by the following formula:

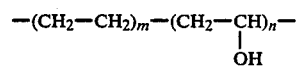

Typical properties of the EVAL copolymer utilized in the tests are set forth in the following Table I:

TABLE I

| Item | Measuring Condition | Unit | Grade |
|---|---|---|---|
| Ethylene content | | mol % | 32 |
| Melting point | | °C. | 181 |
| Melt index | 190° C., 2160 g | g/10 min | 1.3 |
| Density | | g/cc | 1.185 |
| Oxygen transmission rate | 35° C., dry | cc 15 μ/m² 24 hrs atm | 0.4~0.6 |
| Water Vapor transmission rate | 40° C., 90% RH | g 30 μ/m² 24 hrs | 40~80 |
| Pellet size: | | | |
| length | | mm | 3.3 |

TABLE I-continued

| Item | Measuring Condition | Unit | Grade |
|---|---|---|---|
| diameter | | mm | 2.5 |

The ethylene content of the ethylene-vinyl copolymer may comprise 20% to 60% ethylene and preferably about 30% to 45% ethylene.

The tests were conducted by a method comprising a hot mold and a cold mold wherein the volume of the hot mold and the volume of the cold mold where substantially identical. The specific method comprises the following steps to form each container:
1. Poly(ethylene terephthalate), olefin-vinyl alcohol copolymer and adhesive are coextruded into a pipe.
2. A pipe was cut into appropriate length and a preform is formed.
3. The preform or parison was heated to the orientation temperature (90°–100° C.).
4. The preform was blown by blowing fluid which is first applied at a lower pressure and then at a higher pressure to maintain contact of the container with a hot mold (224° C.) to heatset the container.
5. A container was maintained in contact with the hot mold for 1.3 seconds.
6. The container was exhausted to a lower transfer pressure (about 4 p.s.i).
7. The mold was opened and the container was transferred to the cold mold (about 22° C.).
8. The container was reblown at a pressure higher than the transfer pressure in the cold mold.
9. The container was maintained in contact with the cold mold for 1.3 seconds.
10. The container was exhausted to atmospheric pressure.
11. The cold mold was opened and the container was released.

Material distribution for both heatset and non-heatset containers is shown in Table II. These thickness measurements represent the average of 12 locations in the hoop direction of the sidewall of the container. Poly(ethylene terephthalate) and adhesive layer thicknesses were found to be comparable in both cases. The average olefin-vinyl alcohol copolymer layer thickness was comparable; however, the variations of olefin-vinyl alcohol copolymer layer thickness were found to be significantly higher in the case of non-heatset container.

Specimens were cut and then were microtomed in cross-section. Microtoming was done at −120° C. in order to minimize distortion from the cutting process. Sections were stained with tincture of iodine which causes EVAL to be dark in color. Thickness of the samples were measured by using a well known polarizing microscope at 200 magnification.

TABLE II

| | Material Distribution Thickness, in mil | | | |
|---|---|---|---|---|
| | Multilayer Non-Heatset | | Multilayer Heatset | |
| | x | σ | x | σ |
| Outer PET | 3.19 | ±0.34 | 3.36 | ±0.29 |
| Outer Glue | 0.394 | ±0.14 | 0.35 | ±0.08 |
| EVAL | 0.69 | ±0.24 | 0.66 | ±0.08 |
| Inner Glue | 0.27 | ±0.08 | 0.27 | ±0.09 |
| Inner PET | 4.63 | ±0.7 | 4.58 | ±0.59 |

Figure 3:
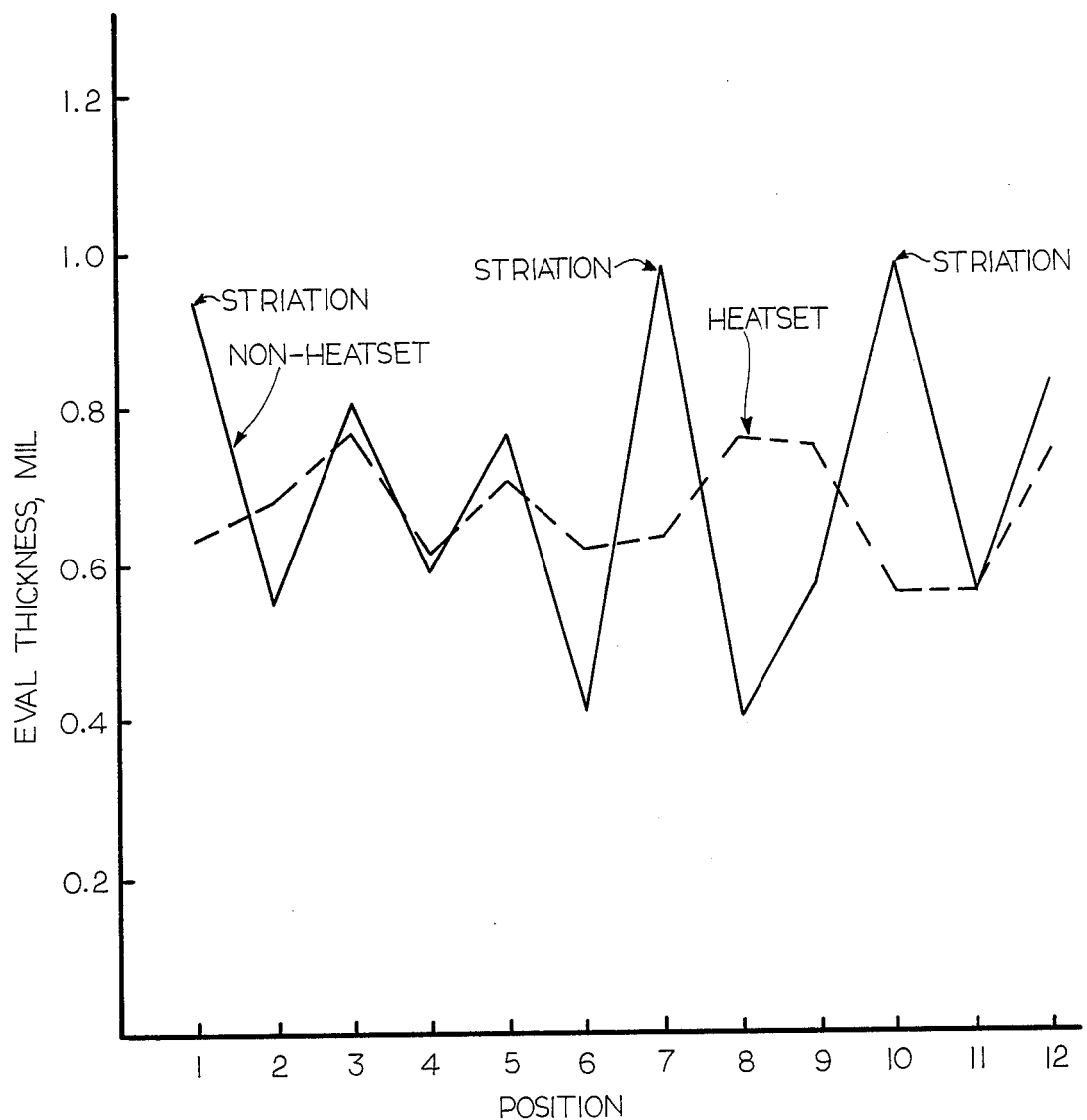
FIG. 3 comprises curves of thickness versus position on the container.

FIG. 3 shows the variations in thickness of the olefin-vinyl alcohol copolymer layer at specific circumferentially spaced locations about the periphery of the container for a multilayer heatset container as well as a non-heatset multilayer container. Excessive variations in thicknesses, as in the case of a non-heatset container, will result in a reduction in inferior barrier properties. Where the thickness is more uniform, the barrier properties will be more improved.

Where the variation in thickness circumferentially is excessive, as in the case of the non-heatset multilayer container, circumferentially spaced visual striations will be evident resulting in a poor appearance. As many as 30-60 lines or striations can be found in a non-heatset multilayer container.

Surprisingly, the heatsetting step eliminated the striations due to substantially lessening the variations in thicknesses of the olefin-vinyl alcohol copolymer.

It should be noted that in a coextrusion process for making the preform, it is difficult to obtain a very uniform thin layer of olefin-vinyl alcohol copolymer due to the difference in rheological properties of olefin-vinyl alcohol copolymer and other layers.

Due to the variations in thickness of the olefin-vinyl alcohol copolymer layer which occur during extrusion, one would expect that the non-uniformity would also be present after blow molding and heat setting.

However, when the multilayer preform with the thin non-uniform layer of olefin-vinyl alcohol copolymer layer is heat set in accordance with the invention, surprisingly the thin non-uniform layer is made more uniform. In addition, the article has good barrier properties and better adhesion is obtained between the layers.

Table III shows the crystallinity or density for multilayer and single layer poly(ethylene terephthalate) heat set containers at a given heatsetting conditions. The composite density of the multilayer heatset container was determined in the same location where the thickness ratios were determined. The average density of poly(ethylene terephthalate) layer was calculated using the data shown in the Table. From the results, it appears that poly(ethylene terephthalate) has a lower degree of crystallinity in the case of multilayer heatset container than a single layer heatset container. At a given heatsetting condition, the crystallinity of the PET layer in a multilayer heatset container was found to be lower by about 4-5%.

As set forth in the aforementioned application Ser. No. 841,651, it was found that the density of the PET layer in a heatset multilayer container comprising a PET layer and copolyester layer was identical to the density of a single layer heatset PET container under identical heat setting conditions. However, in a multilayer layer heatset container according to the invention, the density of the PET layer was surprisingly lower.

TABLE III

| | Crystallinity | | Single Layer PET | |
| --- | --- | --- | --- | --- |
| | Multilayer | | | |
| Heatset Temperature | 224° C. | 224° C. | 224° C. | 224° C. |
| Heatset Time | 1.3 sec. | 6 sec. | 1.3 sec. | 6 sec. |
| Composite Density, g/cc | 1.3515 | 1.3542 | — | — |
| Percent thickness | | | | |
| PET | 36.40 | 36.40 | — | — |
| Adhesive | 3.81 | 3.81 | — | — |
| EVAL | 7.18 | 7.18 | — | — |
| Adhesive | 2.89 | 2.89 | — | — |
| PET | 49.72 | 49.72 | — | — |
| Density of Adhesive, g/cc | 1.1 | 1.1 | — | — |
| Density of EVAL, g/cc | 1.185 | 1.185 | — | — |
| Density of PET, g/cc | 1.3850 | 1.3880 | 1.3892 | 1.3932 |

Density was determined by ASTM 1505.

The peel strength for heatset and non-heatset multilayer containers having identical layers is shown in Table IV. It was surprising that in the case of poly(ethylene terephthalate) and olefin-vinyl alcohol copolymer heatset multilayer structure, the peel strength of the heatset structure was improved by about a factor of three over the non-heatset multilayer structure having identical layers. Peel strength resists delamination of the layers. If delamination occurs, mechanical properties will be diminished and the appearance will be undesirable.

Previous results on the peel strength for multilayer heatset containers having layers of poly(ethylene terephthalate) and copolyester without a separate adhesive, in accordance with the above identified copending application Ser. No. 841,651, have shown that peel strength of such a heatset structure was found to be essentially identical to non-heatset multilayer structures having identical layers.

TABLE IV

| | Peel Strength |
| --- | --- |
| Average of Five Samples | Peel Strength, lb force/inch width |
| Multilayer Heatset | 2.66 |
| Multilayer Non-Heatset | 1.0 |

Figure 4:
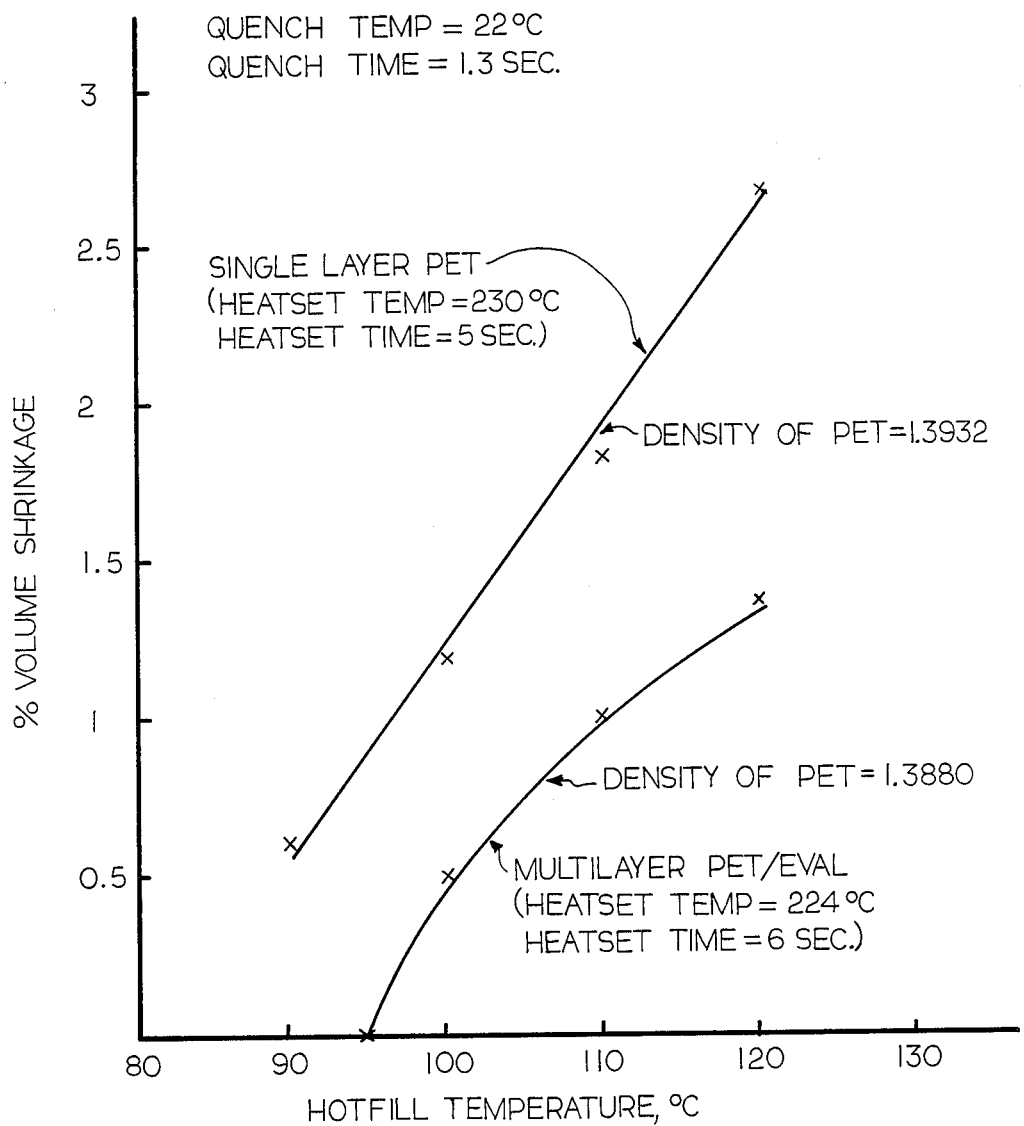
FIG. 4 is a curve of percent volume shrinkage versus hot fill temperature.
Figure 5:
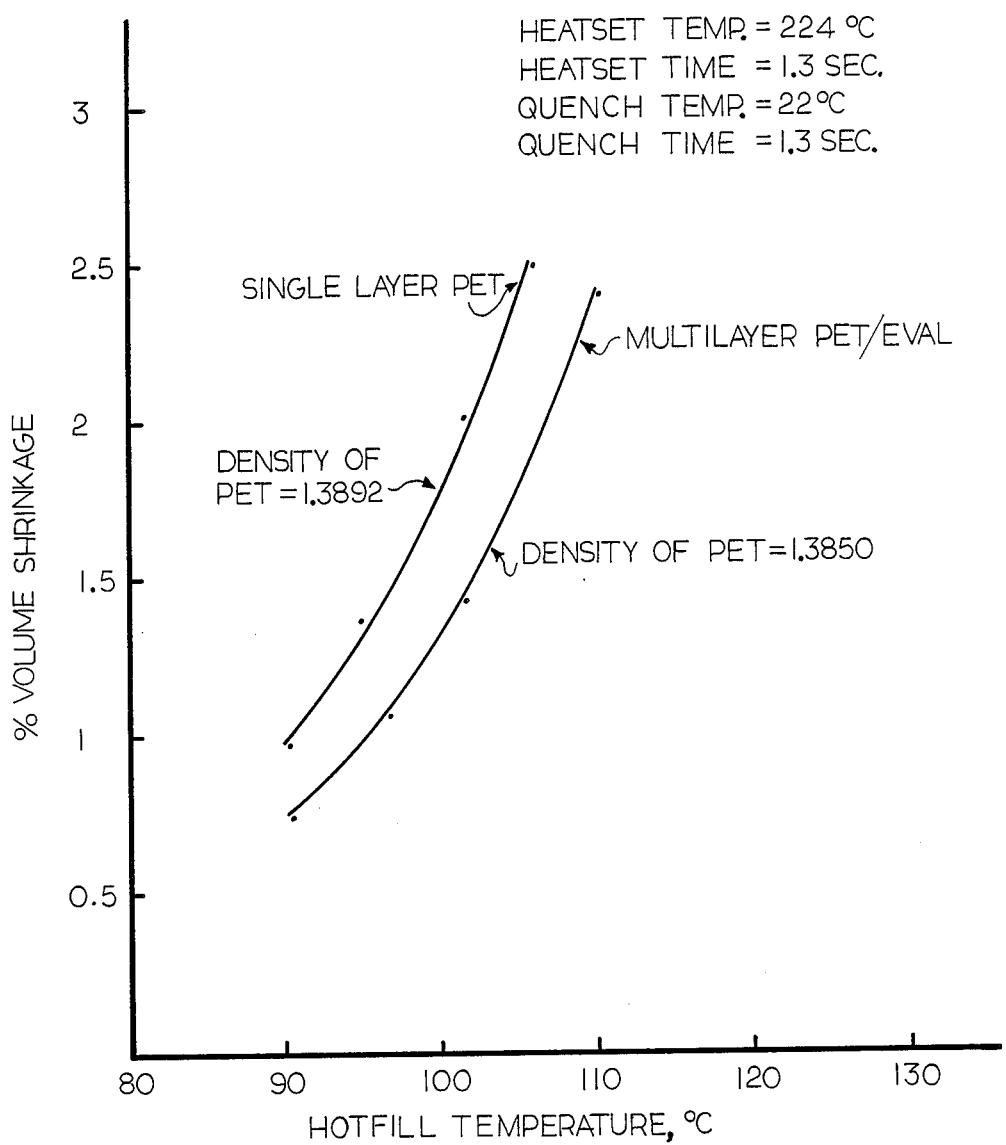
FIG. 5 is a curve of percentage volume shrinkage versus hot fill temperature.

Volume shrinkage at various temperatures was calculated by measuring the hoop and axial shrinkages. Unidirectional shrinkage at a given temperature was measured using Harrop Model TDA-BI-MPO-S Dilatomer. The method is described in Brady and Jabarin "Thermal Treatment of Cold Formed Poly(vinyl chloride)", Polymer Engineering and Science, pp. 686-90 of Volume 17, No. 9, September 1977, except that the samples were cut from the sidewalls of the bottles. In order to estimate the volume shrinkage of the container at a given hot fill temperature, the hoop and axial shrinkages were determined. The volume shrinkage was determined by using the following relationship.

$$S_v = \left[1 - \left(1 - \frac{S_a}{100}\right)\left(1 - \frac{S_h}{100}\right)^2\right] \times 100$$

where
$S_v$ = percent volume shrinkage
$S_a$ = percent axial shrinkage
$S_h$ = percent hoop shrinkage The results are summarized in FIGS. 4 and 5. As indicated in FIG. 4, the single layer heat setting conditions are slightly different. However, since the density of the PET layer in the multilayer container is lower than the density of the PET layer in the single layer container, it would have been expected that at a given hot fill temperature the multilayer container would have shown higher volume shrinkage. Surprisingly, the multilayer container in accordance with the invention showed lower volume shrinkage at a given hot fill temperature even though the PET layer of the multilayer container had a lower density.

In the prior art, it has been understood that in order to obtain higher thermal stability, it is necessary to heat set and obtain higher density; the higher density results in a higher thermal stability.

In FIG. 5, the heat setting conditions of a single layer PET container and a multilayer container in accordance with the invention are identical. For a given hot fill temperature, the multilayer container shows lower volume shrinkage than the single layer PET container even though the density of the PET layer in the multilayer container was less than the density of the PET layer in the single layer PET container.

Optical clarity was measured by percent haze on Gardner hazemeter, according to ASTM D1003. Samples (20 mil or less in thickness) showing the haze value of 10% or less are considered optically clear. Both heatset and non-heatset multilayer containers with identical layers were found to show about 5-6% haze (Table V), and therefore, are optically clear.

TABLE V

| Haze Measurement | |
| --- | --- |
| Sample | % Haze |
| Multilayer heatset | 5.9 |
| Multilayer Non-heatset | 4.8 |

The barrier properties of the heatset and non-heatset container are shown in Table IV. It can be seen that the barrier properties of the multilayer heatset articles are improved by the heatsetting method. As set forth above, it is believed that the improvement is achieved by elimination of the striations and results in more uniform thickness of the barrier layer.

TABLE VI

| Barrier Properties | |
| --- | --- |
| Oxygen Whole-Package Permeability - 73° F., 100% R.H. inside, 50% R.H. outside | |
| Sample - ½ liter container | |
| Sample | $O_2$-Q value in cc/day atm |
| Heatset A | 0.011 |
| Heatset B | 0.012 |
| Non-Heatset A | 0.124 |

Although the invention has been described in connection with a single intermediate layer of olefin-vinyl alcohol copolymer, it is contemplated that the intermediate layer may comprise several layers of different olefin-vinyl alcohol copolymers bonded to one another.

Although the invention has been described in connection with making a hollow blown plastic container, the invention may comprise any hollow article such as a thermoformed article such as a tray or cup, or a laminated sheet.

Although the invention has been described in connection with a laminated article especially useful for hot-fill applications, it is also applicable to other articles where it is desirable to obtain the benefit of good barrier properties, improved layer uniformity and improved peel strength which are obtained by the invention.

Although the laminated article has been described in connection with the two mold method wherein the volume of the hot mold and the volume of the cold mold are substantially identical, the laminated article may be made by the method set forth in U.S. Pat. No. 4,522,779 wherein the cold mold is larger than the hot mold or the method set forth in my pending application Ser. No. 923,503 filed Oct. 27, 1986, titled "METHOD OF MAKING PARTIALLY CRYSTALLINE BIAXIALLY ORIENTED HEAT SET CONTAINERS", having a common assignee with the present application, incorporated herein by reference. When the cold mold is larger, the article will not have improved thermal stability but will have more uniform thickness of olefin-vinyl alcohol copolymer and improved mechanical properties.

The laminated article can also be made by a method utilizing one mold which is heated and then cooled as shown in U.S. Pat. No. 4,512,948, incorporated herein by reference. In addition, a single mold with internal cooling may be used as described in U.S. Pat. No. 4,385,609 or U.S. application Ser. No. 909,800 filed Sept. 22, 1986, having a common assignee with the present invention, both of which are incorporated herein by reference.

Regardless of which method of heat setting is used, the resultant article will have greater uniformity of the olefin-vinyl alcohol copolymer layer and improved adhesion between the layers.

I claim:

1. A multilayer biaxially oriented heatset article comprising
   an outer layer comprising poly(ethylene terephthalate),
   an inner layer comprising poly(ethylene terephthalate),
   at least one intermediate layer of olefin-vinyl alcohol copolymer,
   an adhesive layer laminating the outer layer and the intermediate layer, and
   an adhesive layer laminating the inner layer and the intermediate layer,
   the thickness of said intermediate layer comprising less than 20% of the total thickness,
   said intermediate olefin-vinyl alcohol copolymer layer having greater uniformity in the heat set portions than the olefin-vinyl alcohol copolymer layer of an identical non-heatset multilayer article,
   the peel strength of the heat set multilayer article in the heat set portions being greater than the peel strength of an identical non-heatset multilayer article.

2. The article set forth in claim 1 wherein said article is blow molded.

3. The article set forth in claim 1 wherein said article comprises a blow molded hollow container.

4. The article set forth in claim 1 wherein said article is thermoformed.

5. The article set forth in any of claims 1-4 wherein said intermediate layer comprises ethylene-vinyl alcohol copolymer.

6. The article set forth in claim 5 wherein the intermediate layer comprises about 20% to 60% ethylene.

7. The article set forth in claim 5 wherein said intermediate layer comprises about 30%-45% ethylene.

8. The article set forth in claim 1 wherein said outer and inner layer comprise more than 50% of the total wall thickness, the thickness of the intermediate layer comprises less than 20% of the total wall thickness and the total thickness of the adhesive layers comprises about 2 to 20% of the total thickness.

9. The article set forth in claim 1 wherein said outer and inner layer comprise more than 70% of the total wall thickness, the thickness of the intermediate layer comprises less than 10% of the total wall thickness and the total thickness of the adhesive layers comprises ranging between about 2 to 20% of the total thickness.

* * * * *